United States Patent
Fogwill et al.

(10) Patent No.: US 11,169,125 B2
(45) Date of Patent: Nov. 9, 2021

(54) MASS SPECTROMETER ION SOURCE WITH INTEGRATED COLUMN

(71) Applicant: WATERS TECHNOLOGIES CORPORATION, Milford, MA (US)

(72) Inventors: Michael O. Fogwill, South Grafton, MA (US); Curt Devlin, Fairhaven, MA (US); Theodore A. Dourdeville, Falmouth, MA (US); Jacob N. Fairchild, Upton, MA (US); Geoff C. Gerhardt, Woonsocket, RI (US); Wade P. Leveille, Douglas, MA (US); Joseph D. Michienzi, Plainville, MA (US); Jeffrey Musacchio, Sharon, RI (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 16/384,272

(22) Filed: Apr. 15, 2019

(65) Prior Publication Data
US 2019/0317062 A1    Oct. 17, 2019

Related U.S. Application Data

(60) Provisional application No. 62/657,213, filed on Apr. 13, 2018.

(51) Int. Cl.
*G01N 30/00* (2006.01)
*G01N 30/72* (2006.01)

(52) U.S. Cl.
CPC ..... *G01N 30/7233* (2013.01); *G01N 30/7266* (2013.01)

(58) Field of Classification Search
USPC ........................................................ 250/282
See application file for complete search history.

(56) References Cited

U.S. PATENT DOCUMENTS

| 4,936,974 | A | * | 6/1990 | Rose | G01N 27/44721 |
| | | | | | 204/603 |
| 4,982,097 | A | * | 1/1991 | Slivon | H01J 49/0404 |
| | | | | | 250/281 |
| 5,376,789 | A | | 12/1994 | Stenhagen | |
| 7,858,932 | B2 | * | 12/2010 | Finch | H01J 49/167 |
| | | | | | 250/288 |

(Continued)

FOREIGN PATENT DOCUMENTS

WO    9534089 A1    12/1995

OTHER PUBLICATIONS

Sakairi, "Multi-atmospheric pressure ionisation interface for liquid chromatography-mass spectrometry", Journal of Chromatography A, 794 (1998), pp. 391-406.*

(Continued)

*Primary Examiner* — Phillip A Johnston
(74) *Attorney, Agent, or Firm* — Kacvinsky Daisak Bluni PLLC

(57) ABSTRACT

Techniques and apparatus for ion source devices with minimized post-column volumes are described. In one embodiment, for example, an ion source assembly may include a chromatography column in fluid communication with an ion source device, the chromatography column arranged within a minimum distance of the ion source, the minimum distance comprising between about 60 mm and about 150 mm.

18 Claims, 5 Drawing Sheets

(56) References Cited

U.S. PATENT DOCUMENTS

| | | | | |
|---|---|---|---|---|
| 8,294,091 B2* | 10/2012 | Jarrell | ............... | H01J 49/0422 |
| | | | | 250/288 |
| 8,710,431 B2* | 4/2014 | Newton | ............. | G01N 30/7206 |
| | | | | 250/288 |
| 8,723,109 B2* | 5/2014 | Newton | ............. | G01N 30/7206 |
| | | | | 250/288 |
| 9,053,914 B2* | 6/2015 | Pringle | ............... | H01J 49/0022 |
| 9,281,174 B2* | 3/2016 | Takats | ................ | H01J 49/0031 |
| 10,413,846 B2* | 9/2019 | Bouvier | ................ | G01N 30/30 |
| 2005/0092917 A1 | 5/2005 | Hirabayashi et al. | | |
| 2009/0166525 A1* | 7/2009 | Hughes | ............... | B01D 15/163 |
| | | | | 250/282 |
| 2013/0140180 A1 | 6/2013 | Dovichi et al. | | |
| 2017/0284983 A1 | 10/2017 | Jarrold et al. | | |

OTHER PUBLICATIONS

International Search Report and Written Opinion for International application No. PCT/US2019/027499, dated Jul. 29, 2019, 14 pages.

* cited by examiner

MASS SPECTROMETER ION SOURCE WITH INTEGRATED COLUMN

CROSS-REFERENCE TO RELATED APPLICATION

This application claims priority to U.S. Provisional Patent Application Ser. No. 62/657,213, filed on Apr. 13, 2018, entitled "Mass Spectrometer Ion Source with Integrated Chromatography Column," the contents of which are incorporated herein by reference in their entirety.

TECHNICAL FIELD

Embodiments herein generally relate to mass spectrometry and, more particularly, to an ion source for a mass spectrometer having an integrated chromatography column.

BACKGROUND

The coupling of chromatography techniques to mass spectrometry is an analytical technique that combines the resolving power of chromatography with the detection specificity of mass spectrometry. For example, a liquid chromatography-mass spectrometry (LC-MS) system interfaces a liquid chromatography (LC) system with a mass analyzer (i.e., a mass spectrometer (MS) and/or an ion-mobility spectrometer (IMS)). In general, a sample is introduced into the LC portion of the LC-MS system for separation via an LC separation column. The solution of separated compounds output by the LC separation column are provided to an ion source configured to generate ions from the solution for introduction into the mass analyzer. The mass analyzer operates to detect and identify the ions based on their mass-to-charge (m/z) ratio and/or mobility.

The performance of an LC-MS system is reliant on management of the LC system to ensure transfer of the sample solution to the ion source under proper conditions. A primary factor that controls LC system performance is thermal management of the separation column and the separated compound solution as it travels to the mass analyzer. Thermal management of the separated compound solution may be a function of system materials, column heater operation, transport of the solution from the LC separation column to the mass analyzer, and/or the like. Deficient LC system management may result in band broadening, poor peak capacity, and/or reduced detection signal-to-noise (S/N) ratio.

SUMMARY

In accordance with various aspects of the described embodiments is an ion source assembly that may include a chromatography column in fluid communication with an ion source device, the chromatography column arranged immediately adjacent to the ion source.

In accordance with some aspects of the described embodiments is an ion source assembly comprising a chromatography column in fluid communication with an ion source device, the chromatography column arranged within a minimum distance of the ion source, the minimum distance comprising between about 60 millimeters (mm) and about 150 mm.

In accordance with some aspects of the described embodiments is an ion source assembly comprising a housing, a chromatography column arranged within the housing, and an ion source device in fluid communication with the chromatography column, at least a portion of the ion source device arranged within the housing, the chromatography column arranged within a minimum distance of the ion source, the minimum distance comprising between about 60 mm and about 150 mm.

In accordance with some aspects of the described embodiments is an ion source assembly comprising a chromatography column in fluid communication with an ion source device, and an interface to couple the chromatography column to the ion source device, the chromatography column arranged within a minimum distance of the ion source, the minimum distance comprising between about 60 mm and about 150 mm.

In accordance with some aspects of the described embodiments is an ion source assembly comprising a chromatography column, an ion source device in fluid communication with the chromatography column, the chromatography column arranged within a minimum distance of the ion source, the minimum distance comprising between about 60 mm and about 150 mm, a column seal loading device having the chromatography column arranged therein and at least a portion of the ion source device arranged therein, and a manifold configured to provide a sample to the chromatography column, the column seal loading device removably coupled to the manifold.

In accordance with some aspects of the described embodiments is an ion source assembly comprising a heater configured to heat a sample received at the ion source assembly, a chromatography column to receive the sample from the heater and to generate a separated compound solution, a housing having the heater and the chromatography column arranged therein, an emitter having an inlet end coupled to the housing, the emitter arranged within a minimum distance of the chromatography column, the minimum distance comprising between about 60 mm and about 150 mm, the emitter configured to receive the separated compound solution from the chromatography column, and generate ions from at least a portion of the separated compound solution.

In accordance with some aspects of the described embodiments is an ion source assembly comprising a housing having a chromatography column, a post-column fluid line, and at least a portion of an ion source device fluidically coupled to the chromatography column arranged therein, the chromatography column fluidically coupled to the emitter via a transfer conduit, the post-column fluid line fluidically coupled to the transfer conduit forming a tee body, the chromatography column arranged within a minimum distance of the ion source, the minimum distance comprising between about 60 mm and about 150 mm. In some embodiments, the post-column fluid line may include a post-column addition (PCA) fluid outlet operative to transfer fluid to the transfer conduit. In various embodiments, the post-column fluid line may include a post-column subtraction (PCS) fluid inlet operative to remove at least a portion of fluid flowing through the transfer conduit from the chromatography column to the ion source device.

In accordance with some aspects of the described embodiments, an ion source assembly may comprise a chromatography column to generate a separated compound solution by separating a sample, an ion source device fluidically coupled to the chromatography column via a transfer conduit, the transfer conduit having a minimum distance of between about 60 mm and about 150 mm, the ion source device to receive the separated compound solution from the chromatography column and to generate ions from at least a portion of the separated compound solution, a housing having the chromatography column, a post-column addition (PCA)

fluid line outlet, and at least a portion of the ion source device arranged therein, the PCA fluid line outlet fluidically coupled to the transfer conduit forming a tee body upstream of the ion source device, the PCA fluid line outlet to provide a fluid for mixing with the separated compound solution.

In accordance with some aspects of the described embodiments, the minimum distance may be less than 200 mm. In accordance with some aspects of the described embodiments, the minimum distance may be less than 150 mm. In accordance with some aspects of the embodiments, the minimum distance may be based on a column-ion source device distance. In accordance with some aspects of the described embodiments, the minimum distance may be based on a sample dispersion distance. In some embodiments, the minimum distance may be a distance from an outlet of the column to the end of the ion source device (or emitter). In various embodiments, the minimum distance may be a distance from an outlet of the column to the outlet end of the ion source device. In exemplary embodiments, the minimum distance may be a distance from an outlet of the column to the inlet end of the ion source device. In various embodiments, the minimum distance may be from an outlet of the column to a point of ionization.

In accordance with some aspects of the described embodiments, the ion source device may include an electrospray ionization (ESI) emitter. In accordance with some aspects of the described embodiments, the chromatography column may include a liquid chromatography (LC) column. In accordance with some aspects of the described embodiments, the chromatography column may include a high-performance liquid chromatography (HPLC) column. In accordance with some aspects of the described embodiments, the chromatography column may include ultra-high-performance system liquid chromatography (UHPLC) column. In accordance with some aspects of the described embodiments, the chromatography column may have a length of about 20 mm to about 300 mm. In accordance with some aspects of the described embodiments, the chromatography column may have a length of about less than 100 mm. In accordance with some aspects of the described embodiments, the chromatography column may have a length of about 50 mm to about 100 mm. In accordance with some aspects of the described embodiments, the chromatography column may have a length of about 150 mm. In accordance with some aspects of the described embodiments, the chromatography column may have an inner diameter of about 75 μm to about 50 mm. In accordance with some aspects of the described embodiments, the chromatography column may have an inner diameter of about 1 mm to about 3 mm. In accordance with some aspects of the described embodiments, the chromatography column may have an inner diameter of about 1.0 mm to about 4.6 mm. In accordance with some aspects of the described embodiments, the chromatography column may have an inner diameter of about 4.6 mm.

In accordance with some aspects of the described embodiments, an analysis system may include an ion source assembly according to various embodiments and a mass analyzer. In accordance with some aspects of the described embodiments, the analysis system may include a computing device operative to control operational functions of the ion source assembly and/or the mass analyzer. In accordance with some aspects of the described embodiments, the analysis system may include a processing circuitry operative to control operational functions of the ion source assembly and/or the mass analyzer.

DETAILED DESCRIPTION

Figure 1:
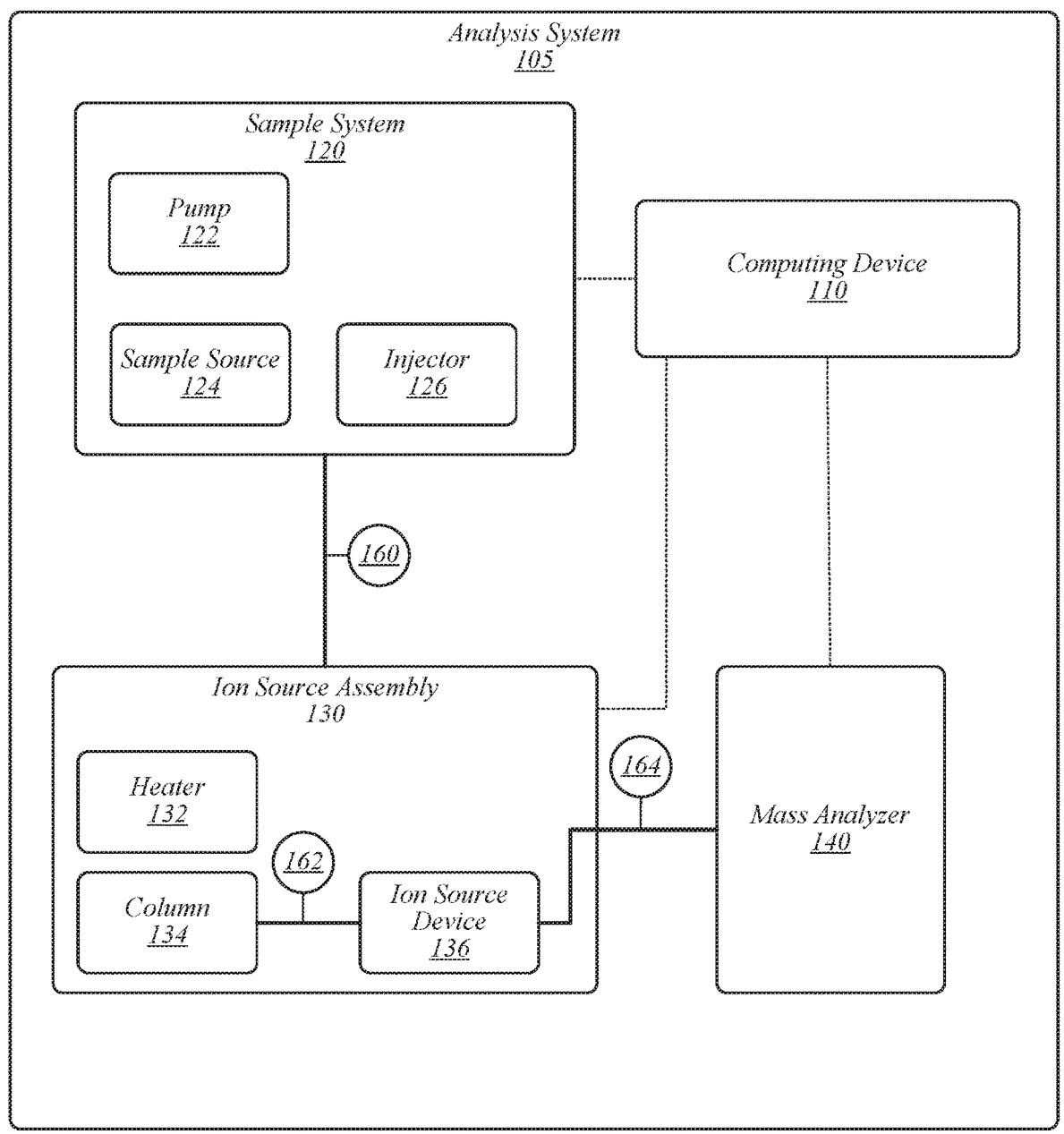
FIG. 1 illustrates an embodiment of a first operating environment.

Various embodiments may generally be directed toward systems, methods, and/or apparatus for performing mass analysis of a sample. In some embodiments, a system may include a chromatography component, an ion source component, and/or a mass analysis component. The chromatography component may operate to separate a sample using a chromatography column (or separation column) to generate a separated compound solution. In various embodiments, the system may include an ion source assembly having an ion source device (probe or emitter) operative to generate ions from the separated compound solution. The ion source may provide at least a portion of the ions to the mass analyzer for analysis.

In some embodiments, the chromatography column may be arranged within the system to minimize the post-column volume of the separated compound solution. In general, the post-column volume is a volume of the separated compound solution between the outlet of the chromatography column and the inlet of the ion source device. For example, in various embodiments, the chromatography column may be arranged within the system to minimize a distance between the chromatography column and the ion source device.

Optimal chromatography, such as liquid chromatography (LC), separation performance requires careful thermal management of the chromatography column. Improper thermal management may result in diminished performance metrics for a mass analysis system, such as band broadening, poor peak capacity, reduced detection S/N (i.e., mass analyzer sensitivity), and/or the like. Conventional liquid chromatography-mass spectrometry (LC-MS) systems require placement of the column within a column heater compartment to provide adequate column thermal management. In addition to column thermal management, reducing the post-column system volume may improve mass analyzer performance metrics. The size of conventional column heaters generally dictates column placement within the LC system and, in particular, prevents placement of the column close to the ion source of the MS. Accordingly, in conventional systems, the distance between the column oven and the ion source requires a lengthy transfer tube to transport column effluent into the MS ion source. This lengthy transfer line reduces chromatographic performance due to its significant post-column fluidic volume.

Accordingly, some embodiments minimize the post-column volume of the separated compound solution by minimizing a travel distance of the separated compound solution from an outlet of the chromatography column to the ion source device of an ion source assembly for a mass analyzer. In this manner, mass analyzer systems configured according to some embodiments may provide improved performance, including reduced band broadening, improved peak capacity, improved detection S/N, and/or the like compared to conventional systems.

In this description, numerous specific details, such as component and system configurations, may be set forth in order to provide a more thorough understanding of the described embodiments. It will be appreciated, however, by one skilled in the art, that the described embodiments may be practiced without such specific details. Additionally, some well-known structures, elements, and other features have not been shown in detail, to avoid unnecessarily obscuring the described embodiments.

In the following description, references to "one embodiment," "an embodiment," "example embodiment," "various embodiments," etc., indicate that the embodiment(s) of the technology so described may include particular features, structures, or characteristics, but more than one embodiment may and not every embodiment necessarily does include the particular features, structures, or characteristics. Further, some embodiments may have some, all, or none of the features described for other embodiments.

As used in this description and the claims and unless otherwise specified, the use of the ordinal adjectives "first," "second," "third," etc. to describe an element merely indicate that a particular instance of an element or different instances of like elements are being referred to, and is not intended to imply that the elements so described must be in a particular sequence, either temporally, spatially, in ranking, or in any other manner.

FIG. 1 illustrates an example of an operating environment 100 that may be representative of some embodiments. As shown in FIG. 1, operating environment 100 may include an analysis system 105 operative to perform mass analysis of a sample. In some embodiments, analysis system 105 may be or may include a chromatography-mass spectrometry system, such as an LC-MS system. Although LC and LC-MS are used in examples in this detailed description, embodiments are not so limited, as other sample separation and sample analysis systems capable of operating according to some embodiments are contemplated herein.

Analysis system 105 may include a sample system 120 operative to provide a sample for separation by column 134. In exemplary embodiments, column 134 may be an LC column. In some embodiments, column 134 may be a column packed with various materials, solutions, and/or the like to separate a sample. Non-limiting examples of materials used to form packed column 134 may include porous particles, non-porous particles, superficially-porous particles, silica particles, polymer particles, organohybrid silica particles, combinations thereof, any of the foregoing particles with chemically modified surfaces, and/or the like. In some embodiments, column 134 may be part of a high-performance liquid chromatography (HPLC) system or an ultra-performance liquid chromatography (UPLC) system (or ultra-high-performance system liquid chromatography (UHPLC) system). For example, sample system 120, column 134, and/or heater 132 may form a chromatography system, such as an LC system, even though portions of the chromatography system may be arranged within or partially within different components (i.e., sample system 120, ion source assembly 130, and/or the like).

In various embodiments, injector 106 may inject a sample 160 from a sample source 124 into column 134. In some embodiments, column 134 may be arranged within ion source assembly (or ion source probe) 130 (see, for example, FIGS. 2 and 3). In some embodiments, at least a portion of column 134 may be arranged within ion source assembly 130. In other embodiments, an entirety of column 134 may be arranged within ion source assembly 130.

Sample 160 may be heated by one or more heaters 132. In some embodiments, at least a portion of column 134 may be arranged within heater 132. In other embodiments, column 134 may be arranged outside of heater. In various embodiments, heater 132 may be arranged in series between injector 126 and column 134 such that sample 160 passes through heater 132 before reaching column 134. Although heater 132 is depicted in FIG. 1 as being within ion source assembly 130, embodiments are not so limited. Heater 132 may be arranged in ion source assembly, sample system 120, other components of analysis system 105, or combinations thereof. In some embodiments, heater 132 may heat a sample (i.e., a mobile phase) prior to entry of the sample into column 134. In exemplary embodiments, various sensors (not shown), such as temperature sensors, may be located within ion source assembly to monitor the temperature of the sample entering column 134 and/or the separated compound solution exiting column 134. In some embodiments, ion source assembly 130 may include other temperature control devices, including cooling devices (not shown).

A pump 122 may operate to pump the sample 160 through the column to separate the sample into component parts and generate a separated sample solution 162, for example, based on a retention time of the sample constituents within column 134. Separated sample solution 162 may be provided to ion source device (or emitter) 136 to generate ions 164 from separated sample solution 162. At least a portion of ions 164 may be provided to mass analyzer 140 for analysis. In various embodiments, ion source assembly 130 may be or may include an electrospray ionization (ESI) device or probe. In some embodiments, ion source device 136 may operate as an ESI device. Although ESI is used in some examples in this detailed description, embodiments are not so limited as any type of ionization device or technique capable of operating according to some embodiments is contemplated herein. For example, ion source assembly 130 may be or may include an atmospheric pressure chemical ionization (APCI) assembly, an atmospheric pressure photoionization (APPI) assembly, an impactor spray assembly, and/or the like.

Mass analyzer 140 may receive ions 164 from ion source assembly 130, for example, from ion source device 136. Mass analyzer 140 may be or may include any type of spectrometry device capable of operating according to some embodiments. For example, mass analyzer 140 may include a mass spectrometer, an ion mobility spectrometer, a time-of-flight (TOF) mass spectrometer, a quadrupole mass spectrometer, ion trap mass spectrometer, combinations thereof (for example, tandem MS-MS system, and/or the like), variations thereof, and/or the like. In some embodiments, analysis system 105 may include, an ESI component, a UHPLC component, and a tandem MS-MS. In various embodiments, analysis system 105 may be or may include a MassLynx system or a Xevo system manufactured by Waters Corporation of Milford, Mass., United States of America.

Analysis system 105 may include a computing device 110 operative to control, monitor, manage, or otherwise process various operational functions of analysis system 105. In some embodiments, computing device 110 may be or may include a stand-alone computing device, such as a personal computer (PC), server, tablet computing device. In other embodiments, computing device 110 may be or may include processing circuitry in combination with memory, software, and other operational components.

In some embodiments, computing device 110, sample system 120, ion source assembly 130, and/or mass analyzer 140 may include processing circuitry (not shown) to perform functions according to some embodiments. Processing circuitry may be any type of analog circuit or digital processor capable of executing programs, such as a microprocessor, digital signal processor, microcontroller, and/or the like. As used in this application, the terms "logic," "circuitry," and/or "module" are intended to refer to a computer-related or analog circuit-related entity, either hardware, a combination of hardware and software, software, or software in execution. For example, processing circuitry of computing device 110, sample system 120, ion source assembly 130, and/or mass analyzer 140 may operate to provide sample 160 to ion source assembly 130 at a particular flow rate, pressure, and/or other operational characteristics. In another example, processing circuitry of computing device 110 and/or mass analyzer 140 may operate to analyze signals received from a detector of mass analyzer 140 produced responsive to detection of ions 164 at the detector to generate spectra or other analysis information, for instance, to identify constituents of separated component solution.

Figure 2:
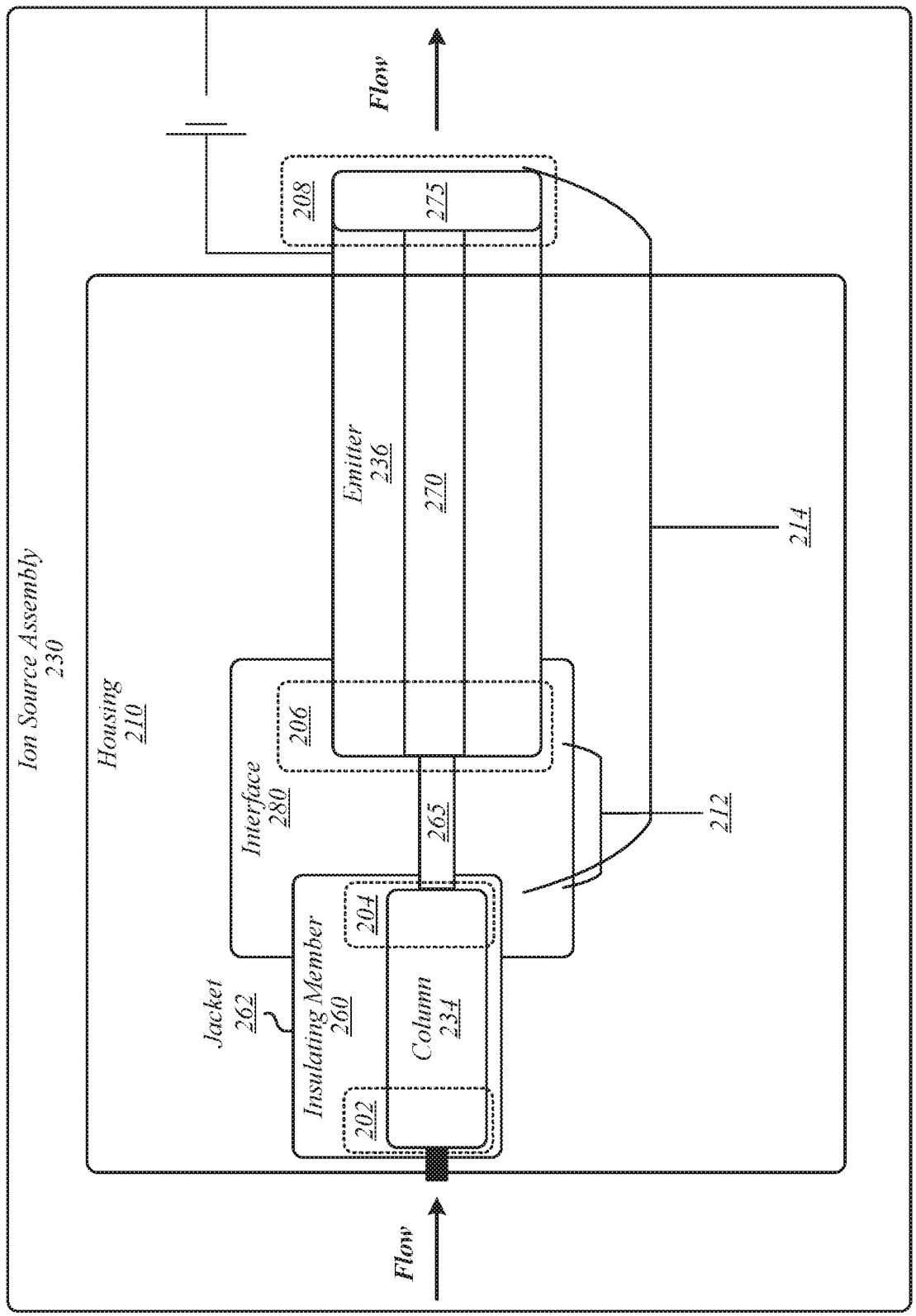
FIG. 2 illustrates an ion source assembly according to some embodiments.

FIG. 2 depicts an ion source assembly according to some embodiments. As shown in FIG. 2, ion source assembly 230 may include a housing 210 having a column 234 and an emitter 236 at least partially arranged therein. Column 234 may include an inlet end 202 (a "column inlet end") and an outlet end 204 (a "column outlet end"). Column 234 may be in fluid communication with emitter 236. For example, column 234 may be fluidically coupled to emitter via transfer conduit 365. Emitter 236 may include an inlet end 206 (an "emitter inlet end") and an outlet end 208 (an "emitter outlet end"). Flow through ion source assembly 230 may be in a direction starting at column 234 and proceeding toward emitter 236. In some embodiments, a heater (not shown (see, for example, FIGS. 1 and 4) may be arranged upstream in fluid communication with column 234. The heater may be operative to heat the sample (i.e., mobile phase) prior to the sample reaching column 234.

A sample fluid may enter column 234 at inlet end 202, for example, forced through column 234 via a pump and/or injector (not shown). In various embodiments, other fluids may enter column 234, such as solvents, reagents, and/or other compounds (see, for example, FIGS. 4 and 5) alone or in combination with the sample. The sample may be separated into a separated component solution within column 234 and may be eluted out of outlet end 204 into transfer conduit 265. The separated component solution may flow through transfer conduit 265 to emitter 236 through inlet end 206. In various embodiments, column 234 may be coupled directly to emitter 236 without requiring transfer conduit 265 (for example, outlet end 204 may be directly coupled to inlet end 206). The separated component solution may travel through emitter 236 via a capillary 270 to a nozzle 275 at outlet end. In various embodiments, a voltage may be applied to or adjacent to emitter 236 to facilitate the generation of ions. Although a positive voltage is indicated in FIG. 2, embodiments are not so limited, as the voltage may be a negative voltage or a positive voltage, depending, for example, on the desired ions, compounds of interest, and/or the like. Ions may be generated from at least a portion of the separated component solution at outlet end 208. For example, in an embodiment in which emitter 236 is an ESI device, nozzle 275 may include a needle, cone- or funnel-shaped structures, include high voltage connections, nebulization gas, desolvation gas, desolvation heat, and/or the like for providing a jet of charged particles for analysis by a mass analyzer (not shown).

In some embodiments, column 234 may be thermally insulated. For example, column 234 may include an insulated column and/or may be used with chromatography techniques according to one or more of U.S. Patent Application Publication Nos. 2015/0129474, 2017/0282096, and 2015/0157959, all of which are incorporated by reference as if fully set forth herein.

For example, in some embodiments, column 234 (an "insulated column" or "vacuum jacketed column") may include an insulating member 260 and/or a jacket 262. In various embodiments, insulating member 260 may be formed from a vacuum chamber surrounding the column 234. Insulating member 260 may include a vacuum chamber having an inert gas arranged therein. In some embodiments, the inert gas may be any of helium, hydrogen, neon, nitrogen, oxygen, carbon dioxide, argon, sulfur hexafluoride, krypton, and xenon. In some embodiments, the vacuum chamber may comprise atmospheric gas. In various embodiments, column 234 and insulating member 260 may be integrated into a single component forming an insulated chromatography column. Jacket 262 may surround column 234 and the vacuum chamber may be formed in an area between column 234 and jacket 262. In some embodiments, jacket 262 may be made of steel. In various embodiments, jacket 262 may be an outer layer of a housing of a column heater. The vacuum chamber forming insulating member 260 may provide thermal insulation for the column. Insulating member 262 may substantially prevent a radial thermal gradient from forming within the column. A heater (for example, heater 132 of FIG. 1) may heat the sample prior to entry of the sample into column 234.

A vacuum jacketed column according to some embodiments enables placement of column 234 outside of a column heater without reducing chromatographic performance. In various embodiments, insulating member 260 and/or jacket 262 may be integrated to column 234 and/or a part of housing 210. In various embodiments, column 234 may be a replaceable element which fits inside insulating member 260 and/or jacket 262, which may be a part of housing 210. Embodiments are not limited in this context. A vacuum jacketed column is able to be placed within smaller spaces than conventional columns, such as within an ion source.

In various embodiments, column 234 (references to column 234 may include a vacuum jacketed column) and emitter 236 may be engaged with an interface 280 within ion source assembly 230. Interface 280 may be or may include one or more structures configured to receive column 234 and emitter 236 and, for example, for support within ion source assembly. Interface 280 may include flanges, recess, ridges, cavities, protrusions, clips, and/or the like to affix or otherwise support column 234 and/or emitter 236 within ion source assembly 230. In some embodiments, interface 280 or components thereof may be configured to couple column 234 to emitter 236 (alone or in combination with the fluidic coupling of column 234 and emitter 236 via transfer conduit 265).

In some embodiments, the dimensions of column 134 may be on an analytical scale. In some embodiments, the dimensions of column 134 may be on a microbore scale. In some embodiments, the dimensions of column 134 may be on a capillary scale. In some embodiments, the dimensions of column 134 may be on a nano scale. In various embodiments, column 134 may have a length of about 20 millimeters (mm) to about 300 mm. In some embodiments, column 134 may have a length of about 5 mm, about 10 mm, about 20 mm, about 30 mm, about 40 mm, about 50 mm, about 100 mm, about 150 mm, about 200 mm, about 250 mm, about 300 mm, about 400 mm, about 500 mm, and any value or range between any two of these values (including endpoints). In some embodiments, column 134 may have a length of about 60 mm. In some embodiments, column 134 may have a length of about 150 mm. In some embodiments, column 134 may have a length of about 60 mm to about 150 mm.

In some embodiments, column 134 may have an inner diameter of greater than or equal to about 100 micrometers (μm). In exemplary embodiments, column 134 may have an inner diameter of greater than or equal to about 75 μm. In some embodiments, column 134 may have an inner diameter of greater than or equal to about 1.0 mm. In various embodiments, column 134 may have an inner diameter of about 1.0 mm to about 2.0 mm. In exemplary embodiments, column 134 may have an inner diameter of about 1.0 mm to about 4.6 mm. In some embodiments, column 134 may have an inner diameter of about 100 μm to about 50 mm. In various embodiments, column 134 may have an inner diameter of about 100 μm, about 200 μm, about 500 μm, about 1 mm, about 2 mm, about 2.1 mm, about 3 mm, about 4.0 mm, about 4.6 mm, about 5 mm, about 10 mm, about 20 mm, about 50 mm, about 100 mm, about 200 mm, and any value or range between any two of these values (including endpoints).

Column 234 may be arranged a distance or minimum distance 212 from emitter 236 ("column-ion source distance" or "column-emitter distance"). In some embodiments, distance 212 may be from the side of outlet end 204 proximate to (or facing) emitter 236 to side of inlet end 206 proximate to (or facing) column 234. In some embodiments, the minimum distance may be a distance from an outlet of column 234 to the end of emitter 236. In various embodiments, the minimum distance may be from an outlet of column 234 to a point of ionization. In some embodiments, distance 212 may be minimized (minimum distance) to reduce or even substantially eliminate post-column sample volume compared with conventional systems. In exemplary embodiments, column 134 may be arranged immediately adjacent to emitter 236. In various embodiments, distance 212 may be about 0 μm (for instance, column 134 is directly coupled to emitter 236), about 2 μm, about 5 μm, about 10 μm, about 20 μm, about 30 μm, about 40 μm, about 50 μm, about 100 μm, about 200 μm, about 300 μm, about 400 μm, about 500 μm, about 1 mm, about 2 mm, about 3 mm, about 4 mm, about 5 mm, about 10 mm, about 20 mm, about 30 mm, about 40 mm, about 50 mm, about 60 mm, about 70 mm, about 80 mm, about 90 mm, about 100 mm, about 125 mm, about 150 mm, about 175 mm, about 200 mm, about 225 mm, about 250 mm, about 275 mm, about 300 mm, about 350 mm, about 400 mm, about 450 mm, about 500 mm, about 600 mm, about 700 mm, about 800 mm, about 900 mm, about 1.0 cm, and any value or range between any two of these values (including endpoints).

Column 234 may be arranged a distance or minimum distance 214 ("sample dispersion distance" or "ionization distance") ranging from the outlet of column 234 (i.e., outlet end 204) to the sample dispersion or ionization area of emitter 236, which may be or include nozzle 275. In some embodiments, the sample dispersion distance may be a distance between where the sample is eluted by column 234 (i.e., out of outlet end 204) and where it is dispersed by emitter 236 (i.e., by nozzle 275). In various embodiments, distance 214 may be about 1 mm, about 2 mm, about 3 mm, about 4 mm, about 5 mm, about 10 mm, about 20 mm, about 30 mm, about 40 mm, about 50 mm, about 60 mm, about 70 mm, about 80 mm, about 90 mm, about 100 mm, about 125 mm, about 150 mm, about 175 mm, about 200 mm, about 225 mm, about 250 mm, about 275 mm, about 300 mm, about 350 mm, about 400 mm, about 450 mm, about 500 mm, about 600 mm, about 700 mm, about 800 mm, about 900 mm, about 1.0 cm, and any value or range between any two of these values (including endpoints).

Figure 3:
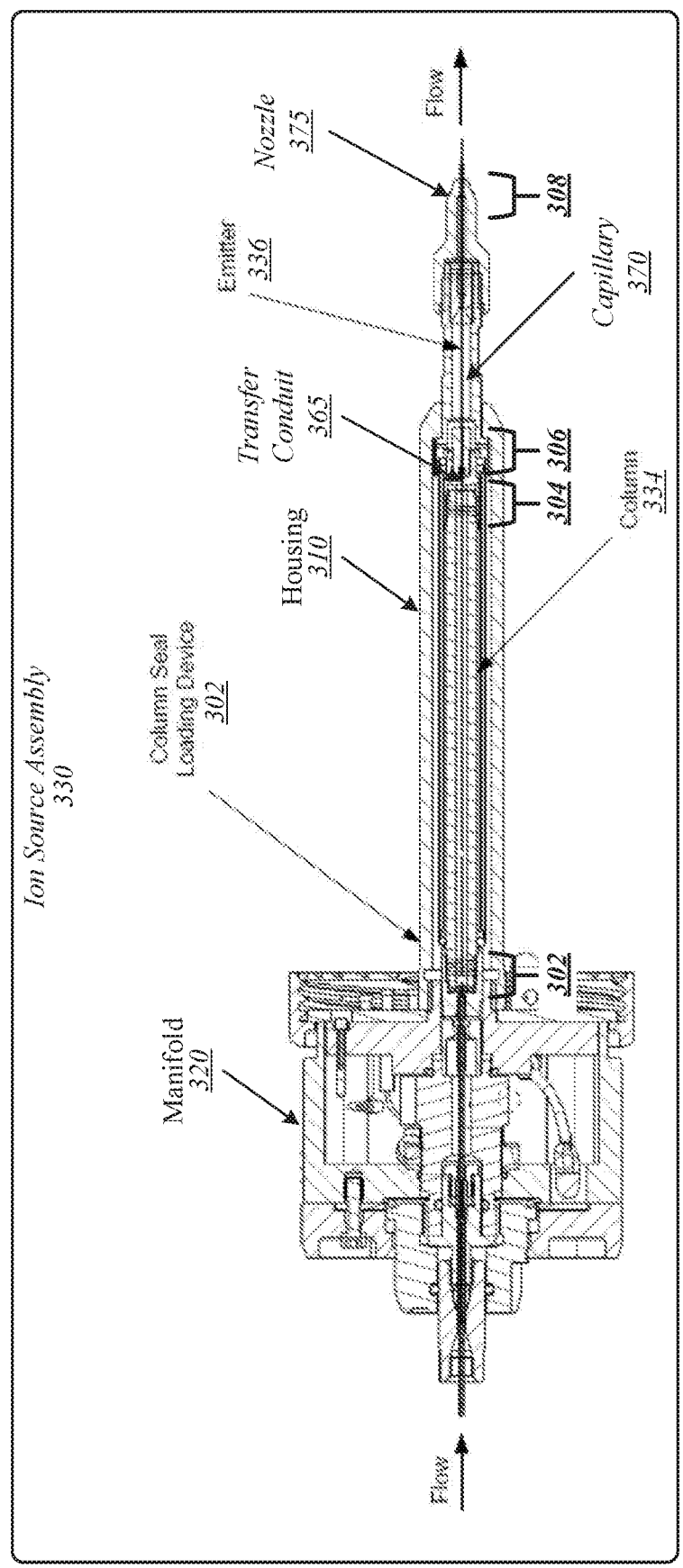
FIG. 3 illustrates an ion source assembly according to some embodiments.

FIG. 3 depicts an ion source assembly according to some embodiments. As shown in FIG. 3, ion source assembly 330 may include a column 334 having an inlet end 302 and an outlet end 304 arranged within a housing 310. In some embodiments, housing 310 may be or may include a column seal loading device 302. In various embodiments, column seal loading device 302 may be removable from ion source assembly 330 to allow for removal and insertion of column 334 and/or portions of emitter 336, such as capillary 370. In various embodiments, ion source assembly 330 and components thereof may be configured to allow for tool-free replacement of column 334, emitter 336, and/or components thereof. Housing 310 may be coupled to or may be a structure of a manifold 320 operative to provide sample and other fluids to column 334.

An emitter 336 having an inlet end 306 and an outlet end 308 may be at least partially arranged within housing. For example, inlet end 306 may be arranged within housing 310. Column 334 and emitter 336 may be fluidically coupled via transfer conduit 365. Separated compound solution may exit outlet end 304, travel through transfer conduit 365, and enter emitter 336 at inlet end 306. In some embodiments, emitter 336 may be an ESI device having a capillary 370 operative to deliver the separated compound solution to nozzle 375 at outlet end 308 to generate ions. In various embodiments, a voltage may be applied to or adjacent to emitter 336 to facilitate the generation of ions. In this manner, emitter 336, column 334, and/or portions thereof may be electrically charged. In some embodiments, column 334 may be grounded or otherwise electrically isolated from emitter 336 to reduce or even prevent column 334 from becoming electrically charged. For example, the distance between column 334 and emitter 336 may be selected to be a length such that the electrical resistance of the mobile phase is sufficient to ground column 334 while maintaining spray voltage the emitter 336.

Figure 4:
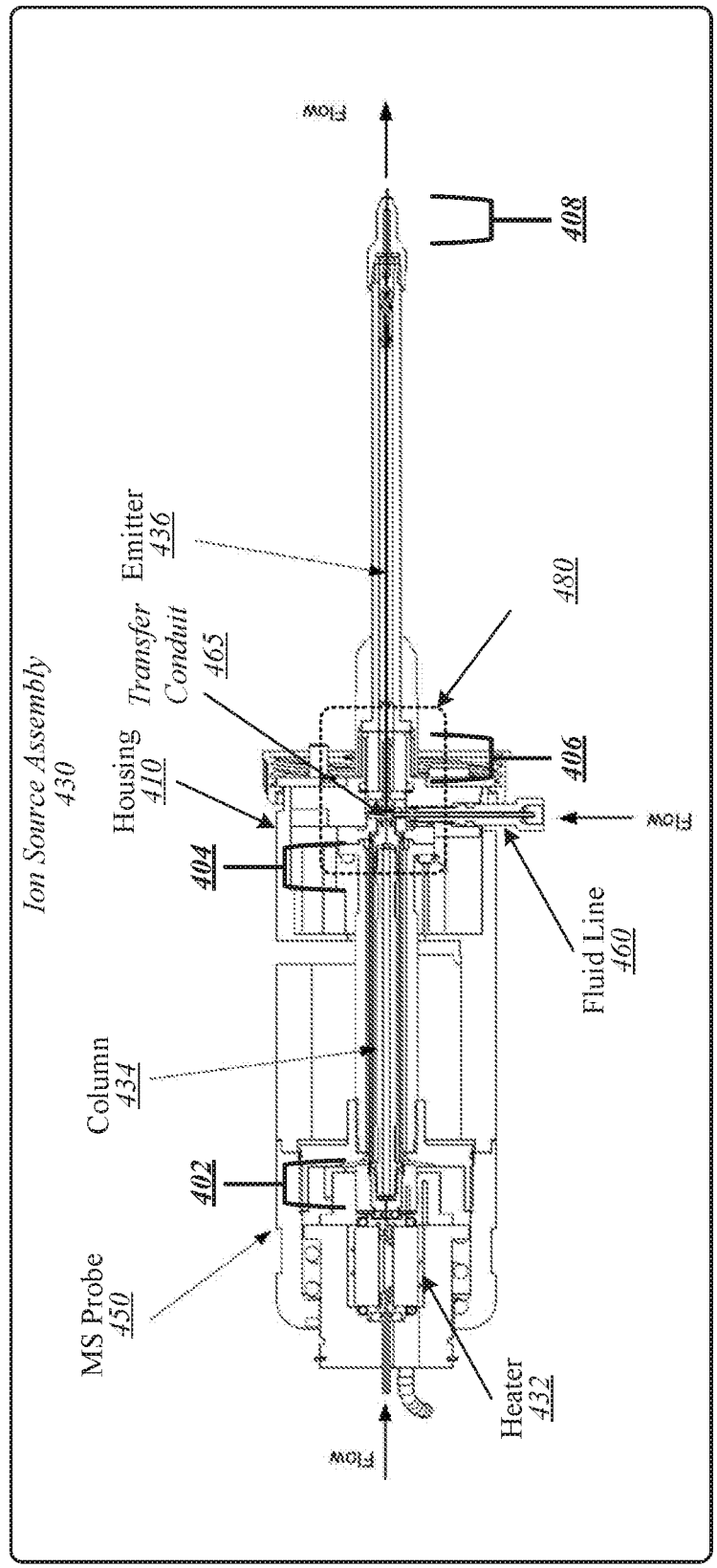
FIG. 4 illustrates an ion source assembly according to some embodiments.

FIG. 4 depicts an ion source assembly according to some embodiments. As shown in FIG. 4, ion source assembly 430 may include an MS probe 450 having a column 434 with an inlet end 402 and an outlet end 404 arranged within a housing 410. Column 434 may be fluidically coupled to an emitter 436 having an inlet end 406 and an outlet end 408 via a transfer conduit 465. In various embodiments, column 434 may be electrically isolated from emitter 436 and any voltages applied to or otherwise associated therewith. In some embodiments, placement of column 434 may allow column 434 to be grounded while maintaining ESI spray voltage at emitter 436. For example, in some embodiments, MS probe 450 may include an integrated heater 432 to heat the sample (for instance, the mobile phase) prior to entry into column 434. In various embodiments, ion source assembly 440 and components thereof may be configured to allow for tool-free replacement of column 434, emitter 436, and/or components thereof A fluid line 460 may be fluidically coupled to column 434, transfer conduit 465, and/or emitter 436. In various embodiments, fluid line 460 may be a post-column fluid line arranged upstream from column 434 and downstream from emitter 436. In some embodiments, fluid line 460 may be fluidically coupled to transfer conduit 465, forming a "T" prior to inlet end 406 of emitter 436 (see FIG. 5). In some embodiments, fluid line 460 may operate as a post-column addition (PCA) of fluid prior to the inlet of the ion source for a mass analyzer (for instance, emitter 436). Fluid line 460 may be used for infusing a sample, standard, solvent, combinations thereof, and/or other fluids into the flow of fluid entering emitter. Infusing a sample through fluid line 460 may allow for, among other things, calibration, tuning, verification or performance, MS method development, flow of ionization-enhancing compounds, solvents to change droplet surface tension, compounds to dilute or otherwise reduce ion suppression, and/or the like. In some embodiments, the post-column tee may allow for direct analysis of a primary dimension effluent in a multidimensional LC system (for example, bypassing the secondary, tertiary, etc., element in a multi-dimensional LC system).

In some embodiments, processing circuitry, for example within computing device 110 and/or ion source assembly 430, may be operative to control the fluid type, flow rate, timing, and/or the like of the introduction of fluid via fluid line 460. For example, fluid may be introduced in pulses via fluid line 460 and/or the flow rate of fluid flowing through fluid line 460 may be adjusted during analysis. Embodiments are not limited in this context.

Although fluid line 460 is described as a PCA operative to add fluid in some examples, embodiments are not so limited. For example, fluid line 460 may be a post-column subtraction (PCS) fluid line arranged to divert or otherwise remove fluid flowing between column 434 and emitter 436. In this manner, for instance, fluid line 460 may operate to divert post-column mobile phase away from emitter 436. In some embodiments in which fluid line 460 is a PCS, computing device 110 and/or ion source assembly 430, may be operative to control the diversion or other removal of fluid via fluid line 460.

Figure 5:
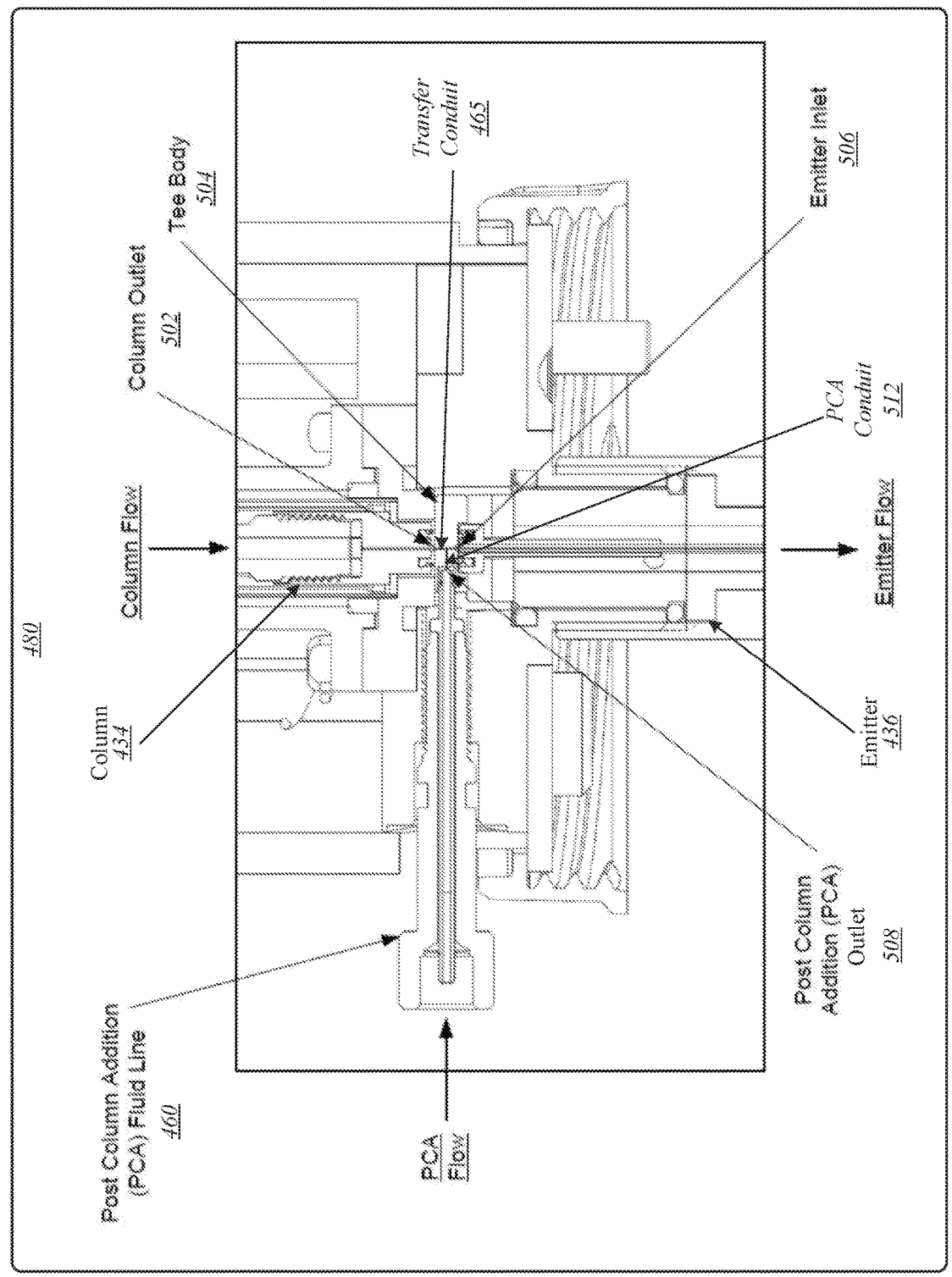
FIG. 5 depicts a detailed view of aspects of the ion source assembly of FIG. 4.

FIG. 5 depicts a detailed view of area 480 of FIG. 4. As shown in FIG. 5, fluid may flow from PCA fluid line 460 via PCA conduit 512, which may intersect transfer conduit 465 to form tee body 504. Separated compound solution flowing out from column 434 via column outlet 502 toward emitter 436 may be mixed with fluid (for example, solvent) flowing out from PCA fluid line 460 via PCA outlet 508 to form a PCA solution. The PCA solution may enter emitter 436 via emitter inlet 506. In some embodiments, the length of PCA conduit 512 may be minimized to facilitate the temperature control, pressure control, concentration, or other management of any PCA solution flowing from fluid line 460 to tee body 504.

Experiment: Analytical-Scale LC Column within Ion Source

A UHPLC system was coupled to a tandem quadrupole MS equipped with an electrospray ionization (ESI) ion source. An ESI probe containing a UHPLC separation column was constructed according to some embodiments and compared to a conventional column placed within a column heater compartment. The conventional column was coupled to a commercially-available, unmodified ESI probe. MassLynx 4.1 produced by Waters Corporation of Milford, Mass., United States of America provided instrument control and data collection. The columns were 2.1×100 mm, packed with 1.6 µm superficially-porous C18, and were maintained at 40° C. The mobile phase was delivered at 700 µL/min and a 3 minute gradient from 5-95% acetonitrile in water was executed.

Improvements in performance metrics, including chromatographic peak capacity and column thermal equilibration rates were observed from relocating the column into ion source according to some embodiments. For example, theoretical peak capacity calculations for a 3 minute 5-95% gradient predicted a 66% improvement. When the system was tested over the same gradient, the empirical peak capacity of propranolol, diltazem, verapamil, alprazolam, 7-ethoxycoumarin, and testosterone improved from 178 (column-in-column oven) to 288 (column arrangement according to some embodiments) when the column placed in the mass spectrometer's prototype ESI probe. A gain of 61% peak capacity was observed.

Column heating and cooling rates we also evaluated between the conventional column oven and a column arranged according to some embodiments. Thermal equilibration was achieved in approximately 20 minutes after a commanded change in column set point from 30° C. to 60° C. when the column was placed in a conventional column oven. The same change in temperature required 22 minutes to thermally equilibrate with the column arranged according to some embodiments. Conversely, when cooling from a commanded change in column set point from 60° C. to 30° C., the conventional column required 91 min to thermally equilibrate while the column arranged according to some embodiments required 22 min to stabilize. Accordingly, the reduced thermal mass of the column arranged according to some embodiments in comparison to the conventional column oven greatly speeds thermal equilibration time when cooling a column.

The column arranged according to some embodiments facilitates extremely high peak capacity through the reduction of post-column system volume by relocating of the column as close to the ion source as possible. In addition, by reducing the thermal mass of the column environment, column thermal equilibration times can be reduced when employing a column arranged according to some embodiments, thereby facilitating improved efficiency in method development. Further, columns arranged according to some embodiments demonstrate the extremely efficient nature of sub-2 µm superficially-porous particles and enables high sensitivity and resolution of samples entering the ion source of a LC-MS system Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An ion source assembly, comprising:
   a housing;
   a chromatography column arranged within the housing, wherein the chromatography column comprises a liquid chromatography column, a high-performance liquid chromatography (HPLC) column or an ultra-high-performance system liquid chromatography (UHPLC) column;
   an insulated jacket or sleeve surrounding at least a portion of the chromatography column; and
   an ion source device in fluid communication with the chromatography column, at least a portion of the ion source device arranged within the housing, the chromatography column arranged within a minimum distance of the ion source, the minimum distance comprising less than about 150 mm.

2. The ion source assembly of claim 1, the minimum distance comprising less than about 60 mm.

3. The ion source assembly of claim 1, the ion source device comprising an electrospray ionization (ESI) emitter.

4. The ion source assembly of claim 1, the chromatography column having a length of about 20 mm to about 300 mm.

5. The ion source assembly of claim 1, the chromatography column having a length of less than about 100 mm.

6. The ion source assembly of claim 1, the chromatography column having an inner diameter of about 75 micrometers (μm) to about 50 mm.

7. The ion source assembly of claim 1, the chromatography column having an inner diameter of about 1.0 mm to about 4.6 mm.

8. The ion source assembly of claim 1, the minimum distance based on a distance between an outlet of the chromatography column and an outlet end of the ion source device.

9. The ion source assembly of claim 1, the minimum distance based on a distance between an outlet of the chromatography column and a point of ionization.

10. The ion source assembly of claim 1, comprising:
    a transfer conduit fluidically coupling the chromatography column to the ion source device, and
    a post-column addition (PCA) fluid line outlet fluidically coupled to the transfer conduit forming a tee body.

11. A method of providing ions for mass analysis, comprising:
    generating ions via an ion source assembly comprising:
      a housing,
      a liquid chromatography column arranged within the housing,
      an insulated jacket or sleeve surrounding at least a portion of the chromatography column; and
      an ion source device in fluid communication with the chromatography column, at least a portion of the ion source device arranged within the housing, the ion source device comprising an electrospray ionization (ESI) emitter, the chromatography column being arranged within a minimum distance of the ion source, the minimum distance comprising less than about 150 mm; and
    mass analyzing the ions via a mass analyzer operably coupled to the ion source assembly.

12. The method claim 11, the minimum distance comprising less than about 60 mm.

13. The method claim 11, the chromatography column having a length of about 20 mm to about 300 mm.

14. The method claim 11, the chromatography column having a length of less than about 100 mm.

15. The method claim 11, the chromatography column having an inner diameter of about 75 micrometers (μm) to about 50 mm.

16. The method claim 11, the chromatography column having an inner diameter of about 1.0 mm to about 4.6 mm.

17. The method claim 11, the minimum distance based on a distance between an outlet of the chromatography column and an outlet end of the ion source device.

18. The method claim 11, the minimum distance based on a distance between an outlet of the chromatography column and a point of ionization.

* * * * *